United States Patent
Ouerd et al.

(10) Patent No.: US 10,823,336 B2
(45) Date of Patent: Nov. 3, 2020

(54) PIVOTABLE TOUCHSCREEN FOR A GAS-DISTRIBUTION FACILITY

(71) Applicants: L'Air Liquide, Société Anonyme pour l'Etude et l'Exploitation des Procédés Georges Claude, Paris (FR); Air Liquide Electronics Systems, Paris (FR)

(72) Inventors: Aziz Ouerd, Grenoble (FR); Hervé Dulphy, Jarrie (FR); Henrique Dos Reis, Polienas (FR)

(73) Assignees: L'Air Liquide, Société Anonyme pour l'Etude et l'Exploitation des Procédés Georges Claude, Paris (FR); Air Liquide Electronics Systems, Paris (FR)

( * ) Notice: Subject to any disclaimer, the term of this patent is extended or adjusted under 35 U.S.C. 154(b) by 0 days.

(21) Appl. No.: 15/749,018

(22) PCT Filed: Jul. 20, 2016

(86) PCT No.: PCT/FR2016/051877
§ 371 (c)(1),
(2) Date: Jan. 30, 2018

(87) PCT Pub. No.: WO2017/021616
PCT Pub. Date: Feb. 9, 2017

(65) Prior Publication Data
US 2018/0320825 A1 Nov. 8, 2018

(30) Foreign Application Priority Data
Jul. 31, 2015 (FR) ...................... 15 57386

(51) Int. Cl.
*G05D 7/00* (2006.01)
*F17C 13/02* (2006.01)
(Continued)

(52) U.S. Cl.
CPC .............. *F17C 13/025* (2013.01); *F17C 7/04* (2013.01); *F17C 13/02* (2013.01); *F17D 3/00* (2013.01);
(Continued)

(58) Field of Classification Search
CPC .................................................... G05D 7/0635
(Continued)

(56) References Cited

U.S. PATENT DOCUMENTS 4,712,191 A * 12/1987 Penna ................. G06F 3/04842
345/173
4,866,594 A * 9/1989 David ...................... G05B 9/02
700/9

(Continued)

FOREIGN PATENT DOCUMENTS

CN 102809999 12/2012
EP 0 926 429 6/1999

OTHER PUBLICATIONS

International Search Report for corresponding PCT/FR2016/051877, dated Oct. 7, 2016.
(Continued)

*Primary Examiner* — Suresh Suryawanshi
(74) *Attorney, Agent, or Firm* — Allen E. White; Patricia E. McQueeney

(57) ABSTRACT

The invention relates to a facility for supplying a working gas provided with an insulating chamber (3) and a door (3') that is pivotable about a vertical axis in order to allow the opening and the closing of said chamber (3), including a device (9) for distributing a working gas having a monitoring and command unit (35, 35A) including means (45) for controlling the monitoring and command unit (35, 35A) which can be actuated by an operator of the distribution device (9, 9A), said controlling means (45) including a
(Continued)

touchscreen (47) having command regions (60, 61, 62, 63, 64, 65, 66, 67, 68) associated with monitoring corresponding tasks, characterised in that said touchscreen is attached to a housing (47A) built into the door (3'), said housing (47A) being capable of and designed to pivot about a vertical axis (Y).

13 Claims, 8 Drawing Sheets

(51) Int. Cl.
  *F17D 3/00* (2006.01)
  *F17C 7/04* (2006.01)
(52) U.S. Cl.
  CPC .. *F17C 2201/032* (2013.01); *F17C 2201/056* (2013.01); *F17C 2201/058* (2013.01); *F17C 2205/0111* (2013.01); *F17C 2205/0146* (2013.01); *F17C 2205/035* (2013.01); *F17C 2205/0326* (2013.01); *F17C 2205/0352* (2013.01); *F17C 2221/037* (2013.01); *F17C 2223/0153* (2013.01); *F17C 2227/04* (2013.01); *F17C 2227/044* (2013.01); *F17C 2250/032* (2013.01); *F17C 2250/034* (2013.01); *F17C 2250/043* (2013.01); *F17C 2250/0636* (2013.01); *F17C 2260/036* (2013.01); *F17C 2260/042* (2013.01); *F17C 2260/044* (2013.01); *F17C 2270/0518* (2013.01); *Y02P 90/02* (2015.11)

(58) Field of Classification Search
  USPC .......................................................... 700/282
  See application file for complete search history.

(56) References Cited

U.S. PATENT DOCUMENTS

| | | | | |
|---|---|---|---|---|
| 5,440,477 | A | * | 8/1995 | Rohrberg ................ F17C 13/02 137/588 |
| 6,273,129 | B1 | * | 8/2001 | Chavand ................ F17C 13/02 137/552 |
| 8,917,513 | B1 | * | 12/2014 | Hazzard ................ H05K 7/1498 361/724 |
| 2002/0110489 | A1 | * | 8/2002 | Reinhardt ............. C12M 41/14 422/64 |
| 2004/0037768 | A1 | * | 2/2004 | Jackson ............ B01D 53/0407 423/500 |
| 2008/0055491 | A1 | | 3/2008 | Gordon et al. |
| 2012/0307456 | A1 | | 12/2012 | Cao |
| 2013/0119838 | A1 | * | 5/2013 | Becker .................... F24C 15/02 312/236 |
| 2014/0322445 | A1 | * | 10/2014 | Slaybaugh .............. C23C 16/52 427/255.23 |
| 2015/0118107 | A1 | * | 4/2015 | Sunkara .................... A61L 2/24 422/24 |

OTHER PUBLICATIONS

Written Opinion of the ISA for PCT/FR2016/051877, dated Jul. 20, 2016 (English translation).

* cited by examiner

PIVOTABLE TOUCHSCREEN FOR A GAS-DISTRIBUTION FACILITY

CROSS REFERENCE TO RELATED APPLICATIONS

This application is a 371 of International Application PCT/FR2016/051877, filed Jul. 20, 2016, which claims priority to French Patent Application 1557386, filed Jul. 31, 2015, the entire contents of which are incorporated herein by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION BY REFERENCE OF A MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

Field of the Invention

The invention relates to a device for distributing a working gas and to a facility for supplying such gases, which device and facility are used to deliver the gases used in methods in various industries, such as the semiconductor, photovoltaic, LED and flat screen industries, or any other industry, such as the mining or pharmaceutical industries, from the cylinder to the apparatus or reactor used for these methods.

The implementation of these methods often requires the use of high-quality hazardous gases, necessitating for example automatic purges and continuous distribution. For example, the manufacture of electronic circuits requires the use of various gases termed "working" gases, such as for example $Cl_2$, $NH_3$, HCl, HBr, $NF_3$ or $WF_6$, etc., which are mostly considered to be hazardous to humans on account of their toxicity and/or of their inflammability.

For this reason, these gases are stored in pressurized gas cylinders arranged in pairs in gas supply facilities, also known under the name "gas cabinets". Such a facility comprises a safety enclosure with controlled extraction and a device for distributing the working gas, arranged in the enclosure.

The distribution device comprises a set of pipelines for supplying gas, purging and extraction, linked to the two pressurized gas cylinders, valves arranged in the pipelines to regulate the flow of the working gas, and gas leak detectors and sensors for measuring the pressures prevailing in the pipelines in order to supervise the operating state of the facility.

The regulation of the valves and the capturing and exploitation of the various signals originating from the leak detectors and the pressure sensors are performed by a monitoring and control unit.

This monitoring and control unit comprises for example a programmed automatic machine and, linked to the latter, a display and control panel.

A block diagram of the facility is depicted on this panel.

In order to signal alarms to an operator responsible for supervising the facility, a multitude of indicator lights, each associated with a specific alarm, are arranged in the panel. Additionally, switches for controlling the valves, enabling the facility to operate in manual mode, are also installed in this panel. Furthermore, various display elements mounted in the panel and controlled by the automatic machine show the measured values captured by the sensors.

The control panel, due to the numerous indicators, switches and display elements, at first sight appears complicated and not very user-friendly, such that quite a long period of learning is required to train an operator responsible for supervising the facility.

The invention aims to mitigate this drawback firstly by providing a distribution device equipped with a display and control interface that is more user-friendly.

Secondly, these facilities are generally equipped with a door that enables the operator to access the inside of the enclosure and thus handle the gas cylinders and/or the various elements that are arranged in said enclosure. Once the door is open, the operator no longer has access to the elements present on the front face of the door, such as the switches and display elements, and the display and control panel. This constitutes a major drawback for the operator regarding his use of the facility.

Description of Related Art Including Information Disclosed Under 37 CFR 1.97 and 1.98

Not applicable.

BRIEF SUMMARY OF THE INVENTION

To this end, one subject of the invention is a facility for supplying a working gas, equipped with an isolation enclosure and with a door pivotable about a vertical axis in order to enable said enclosure to be opened and closed, comprising at least one source of a pressurized working gas, said source being arranged in the isolation enclosure, and comprising a device for distributing a working gas, comprising a set of pipelines linked to at least one working gas source and to at least one output pipeline for routing the working gas to a consumer station, functional components, in particular valves arranged in the pipelines and used to regulate the flow of the working gas in said pipelines, and gas leak detectors, and a monitoring and control unit comprising means for communicating with said functional components, means for monitoring tasks relating to said functional components, and means for managing the monitoring means that are able to be actuated by an operator of the distribution device, said management means comprising a touchscreen having control zones associated with the monitoring of corresponding tasks, characterized in that said touchscreen is attached to a housing integrated into the door, said housing being able to and designed to pivot about a vertical axis.

The pivotable housing enables the operator operating on the cylinders or other components to access the touchscreen and possibly a stop button from the outside of the cabinet when the door is closed, and from the inside of the facility, which is for example in the form of a cabinet, when the door is open.

The distribution device according to the invention may additionally include one or more of the following features:

- the touchscreen comprises, for at least one main control zone, at least one secondary control zone associated with said at least one main zone and relating to an instruction for monitoring the task corresponding to said at least one main control zone, said at least one secondary control zone being delineated by a graphic associated with said instruction and displayed on said touchscreen only in the event of activation of said corresponding main control zone by an operator,
- the touchscreen comprises a first region reserved exclusively for said main control zones and a second region separate from said first region and intended for said secondary control zones,
- the touchscreen furthermore comprises a third region separate from said first and second regions and reserved for displaying an item of information relating to a main control zone activated by an operator,
- the management means additionally comprise means for signaling, on the touchscreen, a control zone activated by an operator,
- a task monitored by the monitoring means relates to the management and in particular to the display, on the touchscreen, of the alarms detected by the functional components, and one of the main control zones of the touchscreen is a zone for activating the display of the alarms that are raised,
- if the device is equipped with measuring sensors, in particular for measuring the pressures prevailing in the pipelines, a task monitored by the monitoring means relates to the evaluation of the measured values captured by said measuring sensors and to the display of said values on the touchscreen, and one of said main control zones is a zone for activating the display, on the touchscreen, of the measured values that are captured,
- if the device is equipped with measuring sensors, in particular for measuring the pressures prevailing in the pipelines, the management means comprise means for storing a block diagram showing in particular all of the pipelines of the device for distributing the working gas and the valves arranged in said pipelines, a task monitored by the monitoring means relates to the evaluation of the measured values captured by said sensors and to the joint display, on the touchscreen, of the block diagram of the distribution device, which block diagram is recorded in said storage means, and of said measured values captured by the sensors, and one of said main control zones is a zone for activating the display, on the touchscreen, of the block diagram with the measured values that are captured.

Alternatively, the screen shows only an overview that comprises the pressure sensors and the binary state of the distribution. This type of simplified screen has a small size and therefore reduces the bulk.

One subject of the invention is additionally a facility for distributing a working gas, characterized in that it comprises a first and a second device for distributing a working gas, such as defined above, that are arranged in parallel and the monitoring and control units of which are in communication with one another, in that the second device is a component that is functional with respect to the first device, in that a task of the monitoring means of the first device relates to the supervision of the operating state of the second device, which is considered to be a functional component, and in that one of said main control zones of the touchscreen of the first device is a zone for activating the display, on the touchscreen of the first device, of information regarding the operating state of the second device. The facility for distributing the working gas may in addition include the following feature:

- if the second distribution device is equipped with measuring sensors, in particular for measuring the pressures prevailing in its pipelines, the management means of the first distribution device comprise means for storing a block diagram showing in particular all of the pipelines of the second device for distributing the working gas and the valves arranged in said pipelines, a task monitored by the monitoring means of the first distribution device relates to the evaluation of the measured values captured by the sensors of the second distribution device and to the display, on the touchscreen of the first distribution device, of the block diagram of the second distribution device, jointly with said measured values captured by the sensors of the second distribution device, and one of said main control zones of the touchscreen of the first device is a zone for activating the display, on the touchscreen of the first distribution device, of the block diagram of the second distribution device with the measured values captured by said measuring sensors of the second device.

Alternatively, the screen shows only an overview that comprises the pressure sensors and the binary state of the distribution. This type of simplified screen has a small size and therefore reduces the bulk.

One subject of the invention is additionally a facility for supplying a working gas, comprising at least one source of a pressurized working gas, arranged in an isolation enclosure, characterized in that it comprises a distribution device such as defined above, linked to said at least one source and arranged in said isolation enclosure, and in that the touchscreen of the distribution device is integrated into the external wall of said enclosure.

The facility for supplying the working gas may additionally include one or more of the following features:

- if said source is a gas cylinder, a task monitored by said monitoring means of the distribution device relates to the control of the pipeline purging cycles before and after each replacement of an empty cylinder with a full cylinder, and one of said main control zones of the touchscreen is a zone for activating the control of the valves for the purpose of activating the purging cycles,
- if the facility comprises a first and a second working gas source that are linked to the distribution device and intended to alternately feed said distribution device, a task monitored by said monitoring means of the distribution device relates to the control of the switchover of a feed of the distribution device from the first source to a feed from the second source, and one of said main control zones of the touchscreen is a zone for activating the control of the valves for the purpose of said switchover.

The facility as defined above, characterized in that the management means are able to and designed to be controlled remotely, by way of a WiFi connection, by a tablet, a smartphone or a portable computer with a screen having at least the control zones as defined above.

The facility as defined above, characterized in that an emergency stop button is attached to said housing, said housing being situated at a height of less than 1.70 m from the ground.

The facility as defined above, characterized in that the size of the touchscreen is less than 12 inches, preferably less than 6 inches.

BRIEF DESCRIPTION OF THE SEVERAL VIEWS OF THE DRAWINGS

Other features and advantages of the invention will emerge from the following description, given by way of example, without being limiting, with reference to the appended drawings, in which.

DETAILED DESCRIPTION OF THE INVENTION

Figure 1:
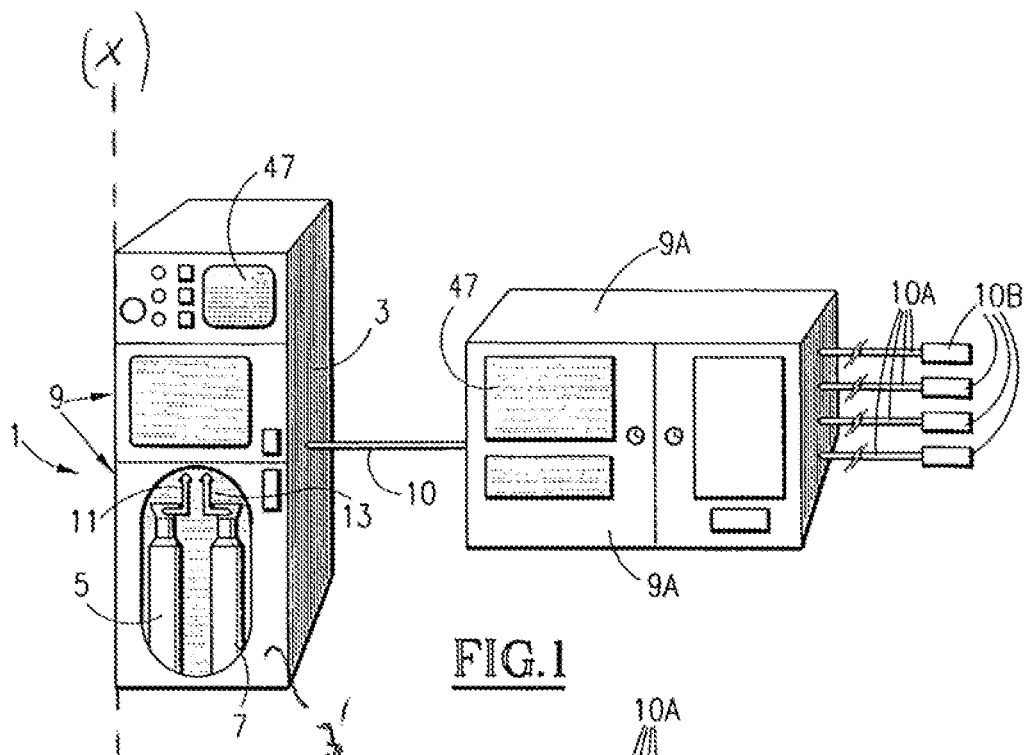
FIG. 1 is a schematic perspective view of a facility for supplying a working gas and equipped with a device for distributing this gas according to the invention.

FIG. 1 shows, in a schematic perspective view with a cutout in its lower part, a facility 1 for supplying a working gas, said facility being intended to feed one or more stations consuming these gases.

This facility 1 comprises an isolation enclosure 3 in which are installed firstly, as is able to be seen in the figure by virtue of the cutout, two cylinders 5 and 7 of a pressurized working gas and, secondly, a device 9 for distributing the working gas, the pipelines 11 and 13 of which device, linked to the cylinders 5 and 7, respectively, are shown in this figure. This facility 1 also includes a door 3' pivotable about a vertical axis (X) in order to enable said enclosure 3 to be opened and closed.

The facility 1 is connected, via its output pipeline 10, to a second device 9A for distributing the working gas, used to supply the working gas, by way of its output pipelines 10A, simultaneously to a plurality of consumer stations 10B.

Figure 2:
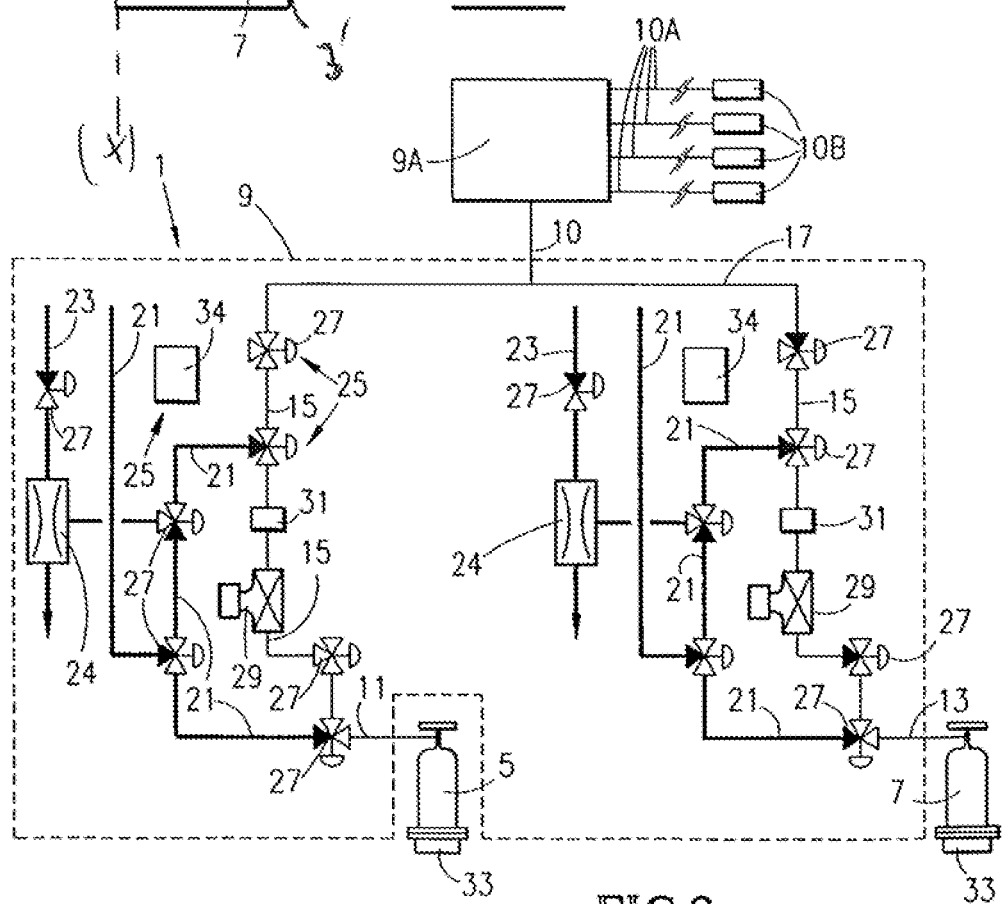
FIG. 2 is a diagram of the pipelines of the device for distributing the working gas mounted in the facility of FIG. 1.

As is seen in FIG. 2, the device 9 for distributing the working gas of the facility 1 includes a set of pipelines comprising in particular, for each cylinder 5 and 7, a main pipeline 15 linked, by way of a shared pipeline 17, to the output pipeline 10 in order to route the working gas to the consumer stations 10B, purging pipelines 21 and gas extraction pipelines 23 for obtaining a partial vacuum in the enclosure 3 by virtue of the activation of a vacuum generator 24.

In order to be able to regulate the various flows of gas in the various pipelines and to supervise the operating state of the distribution device 9, the latter comprises functional components 25, such as shut-off valves 27 and regulating valves 29 that are arranged in the various pipelines 15, 17, 21 and 23, sensors 31 for measuring the pressures prevailing in particular in the main pipelines 15, scales 33 for weighing the cylinders 5 and 7, making it possible to determine the fill level of the cylinders if they are filled with a liquefied gas, or else gas leak detectors 34, arranged in the enclosure 3 of the facility.

Figure 3:
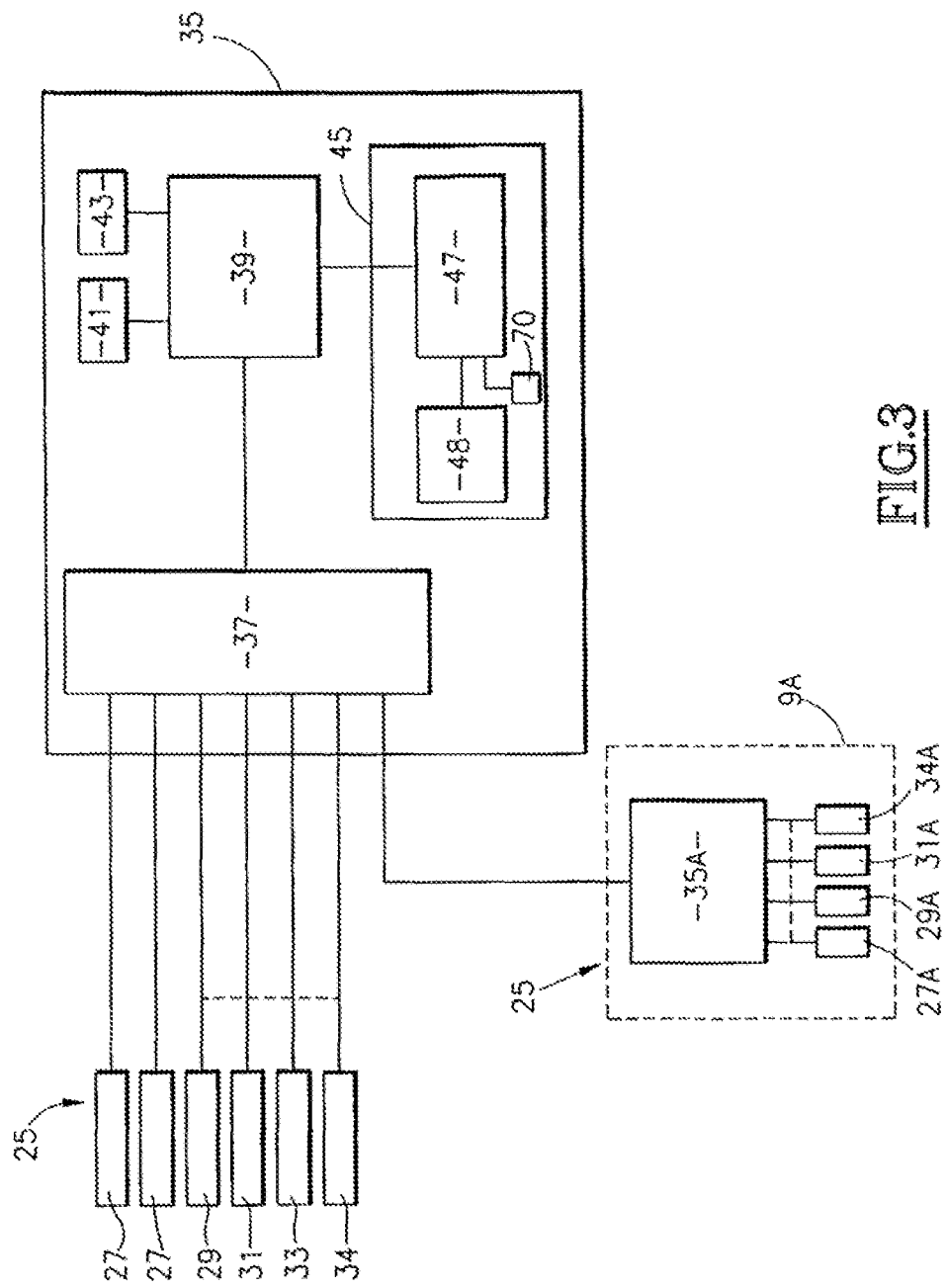
FIG. 3 is a block diagram of a monitoring and control unit of the distribution device according to the invention.

As is seen in the diagram of FIG. 3, these functional components 25 are all linked to a monitoring and control unit 35. This unit 35 for monitoring and controlling the functional components 25 comprises means 37 for communicating with these functional components 25 and, linked to these means 37, means 39 for monitoring various tasks relating to the functional components 25, these tasks being stored in a task memory 41.

Such tasks involve for example comparing the measured values captured by the sensors 31 and/or by the scales 33 with predefined threshold values stored in a threshold memory 43, generating an alarm signal if one of the measured values exceeds the associated threshold and, possibly, depending on the predefined priority level of the alarm, a partial or full shutdown of the facility 1. In this case, the means 39, by way of the communication means 37, control the closure of some of the valves of the facility.

Another task involves for example controlling the valves 27 and 29 when for example the cylinder 5 feeding the device 9 is practically empty and it is necessary to switch the feed of the distribution device 9 over to the cylinder 7, or vice versa.

Yet another task relates to the detection of gas leaks by way of the detectors 34 and, if such a leak is detected, to the generation of an alarm signal and to a partial or complete shutdown of the facility 1.

Moreover, the second distribution device 9A forms a particular functional component 25 with which a special task is associated, of which device only the monitoring and control unit 35A and functional components linked to this unit 35A are shown in FIG. 3. Given that the structure of the device 9A is similar to that of the device 9 in the sense that it also comprises a set of pipelines and functional components such as valves 27A and 29A arranged in its pipelines in order to regulate the flow of the working gas, sensors 31A for measuring the pressures prevailing in the pipelines and gas leak detectors 34A, the particular layout of the pipelines and of the valves will not be described in greater detail.

However, it should be noted that the monitoring and control unit 35A of the device 9A is identical to the monitoring and control unit 35 of the distribution device 9.

As shown in FIG. 3, the monitoring and control unit 35A is linked to the communication means 37 of the unit 35.

A special task monitored by the means 39, by way of the means 37, relates to the supervision of the operating state of the device 9A.

In particular, the pressure values measured by way of the sensors 31A and possible leaks detected by the detectors 34A are transmitted to the monitoring means 39.

The various tasks may be monitored by the means 39 either in parallel or sequentially, or only upon detection of an event, such as for example the detection of an alarm.

Additionally, the monitoring and control unit 35 comprises means 45 for managing the monitoring means 39, enabling an operator for example to activate a task or to choose and to define certain parameters necessary for monitoring a task.

To this end, the management means 45 comprise a touchscreen 47 and means 48 for storing diagrams or graphics that are intended to be displayed on the touchscreen 47.

As is seen in FIG. 1, the touchscreen 47 is integrated into the outer wall of the upper part of the enclosure 3 of the facility 1 such that it is clearly visible and accessible to an operator responsible for supervising the facility.

Advantageously, the screen 47 is integrated into the door of the enclosure.

Figure 9:
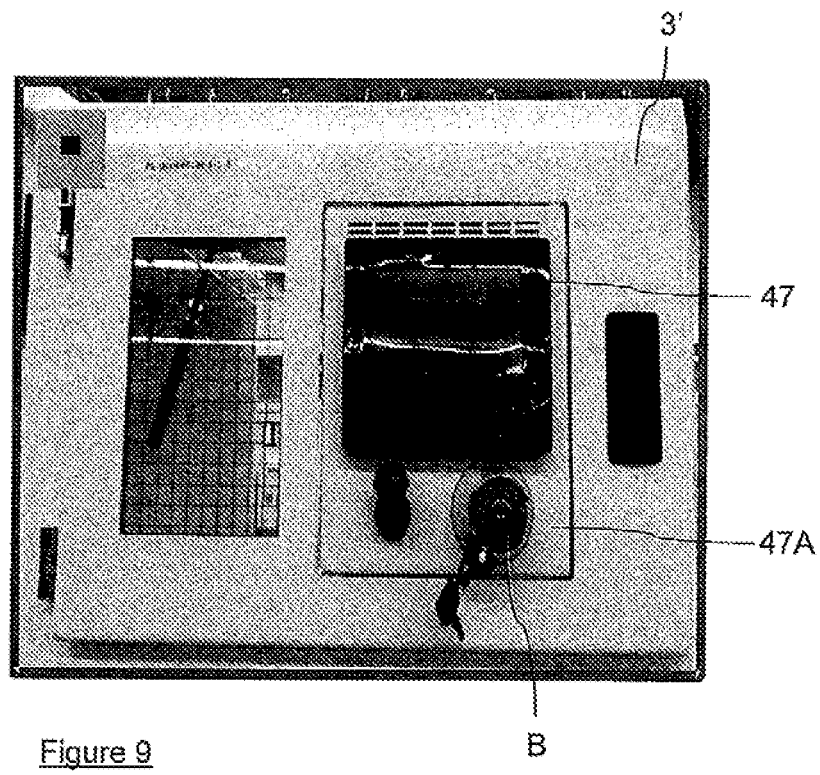
FIG. 9 is a view of the housing bearing the touchscreen when the door of the facility is closed.

As is seen in FIG. 9, the touchscreen 47 is attached to a housing 47A integrated into the outer wall of the upper part of the enclosure 3 of the facility 1. When the door 3' is closed, the housing is in the same plane as said door. As a result, the operator positions himself in front of the facility 1 in order to read and access the touchscreen 47.

Figure 10:
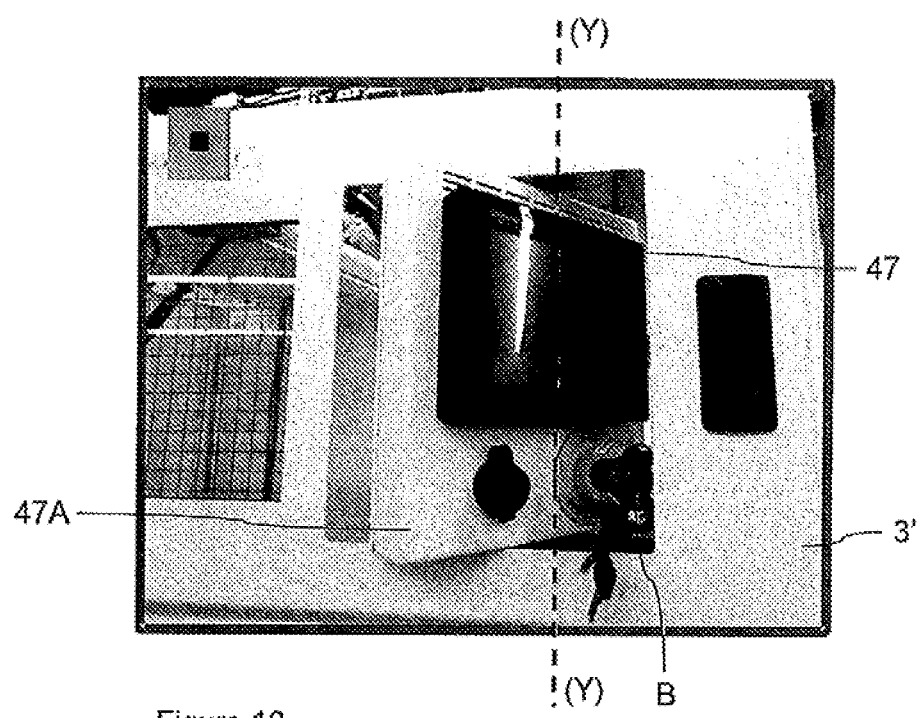
FIG. 10 is a view of the housing bearing the touchscreen when the door of the facility is open.

As is seen in FIG. 10, when the door 3' is open, the housing 47A pivots about a vertical axis (Y). Thus, when the operator accesses the inside of the enclosure 3, the touchscreen 47 is accessible even when the door is open.

FIGS. 9 and 10 also show an emergency stop button B attached to the pivotable housing 47A.

A connecting device for linking the information from the automatic machine (39) to the outside (Maintenance tool, supervision, etc.) may be integrated. As may a key for switching to maintenance mode.

Figure 4:
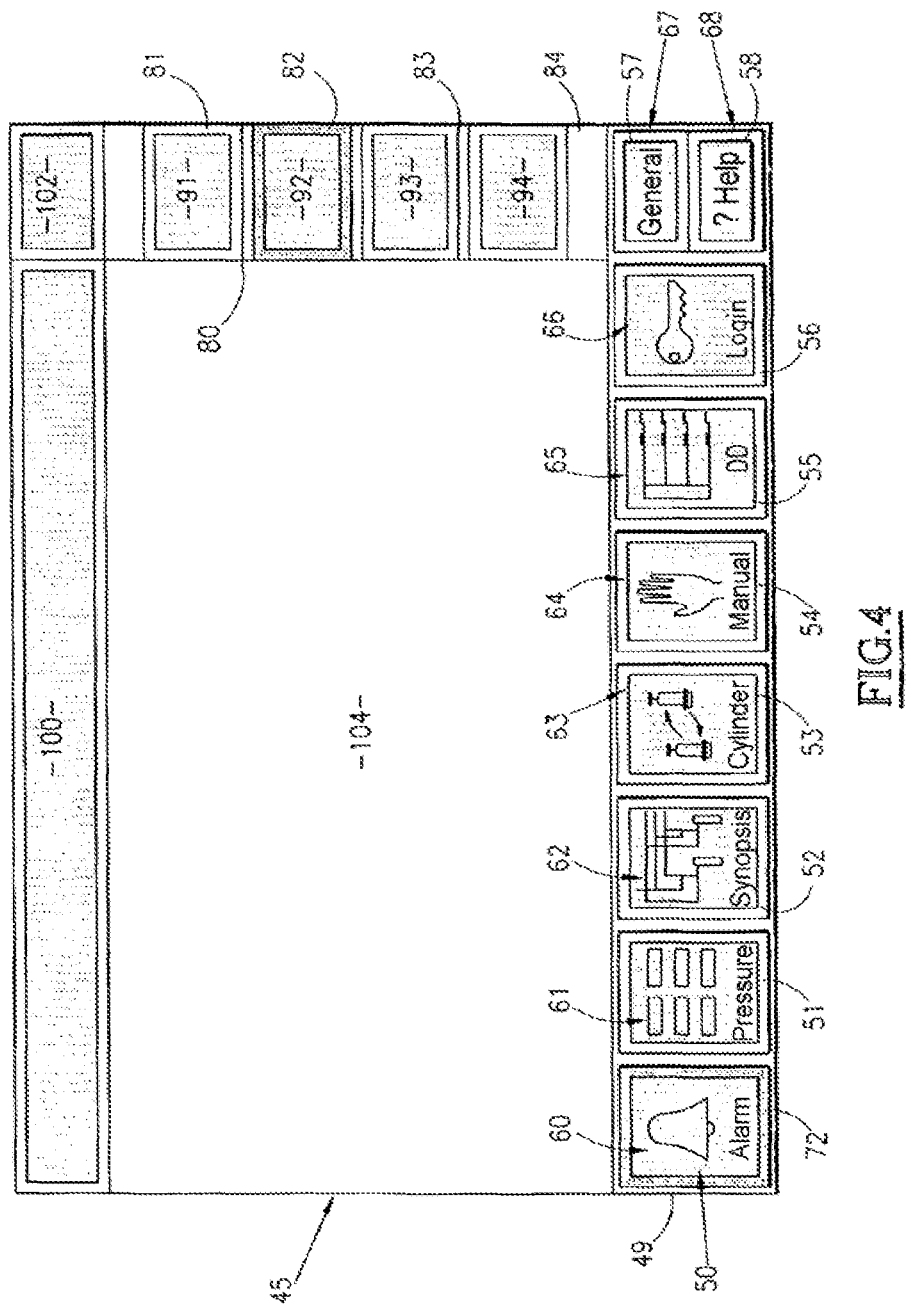
FIG. 4 is a diagram of the touchscreen of the device according to the invention.

An example of a touchscreen able to be used according to the present invention is shown in greater detail in FIG. 4.

With reference to this FIG. 4, the touchscreen 47 comprises, at the bottom, a first region 49 in which graphics 50, 51, 52, 53, 54, 55, 56, 57 and 58 are permanently displayed. Each graphic 50 to 58 delineates, on the touchscreen 47, an associated main control zone, bearing the reference numerals 60 to 68, respectively, that is to say zones by way of which an operator responsible for supervising the facility 1 enters, through contact with his finger on the touchscreen 47, a command relating to a predetermined task in the management means 45.

This first region 49 is strictly reserved for these main control zones 60 to 68 with the associated permanently displayed graphics 50 to 58. These main control zones 60 to 68 are permanently ready to receive a command from the operator. This is particularly advantageous when the means 39 are monitoring various tasks in parallel, as the operator is able to access the management of a task through simple activation of the main control zone associated therewith.

For some specific tasks, it is necessary to provide the operator with the option of choosing or entering, after the activation of the corresponding main zone, a parameter or a control instruction relating to this specific task.

To this end, the touchscreen 47 additionally comprises, on the right-hand side thereof, seen in FIG. 4, a second region 80 separate from the first region 49 and in which are displayed, depending on the task that is activated, graphics 81, 82, 83 and 84, which are shown only by frames in this figure. These graphics 81 to 84 delineate secondary control zones bearing the reference numerals 91 to 94, respectively. These secondary control zones enable the operator to perform various operations relating to the specific task that is activated.

Of course, the graphics 81 to 84 and thus the operations that the operator is able to enter in the management means 45 change depending on the main control zone and thus the task that are activated.

Moreover, as seen in FIG. 3, the management means additionally comprise means 70 for signaling, on the touchscreen 47, a main or secondary control zone activated by an operator. As shown in FIG. 4, the signaling means 70, following the activation of a control zone, for example the activation of the zone 60, bring about the display, on the touchscreen 47, for example of a colored frame 72 surrounding the main control zone 60 that is activated. The operator is thus always informed of the active task displayed on the screen.

Moreover, the touchscreen 47 comprises, at the top, a third region 100 separate from the first and second regions 49 and 80 and that is reserved for displaying an item of information relating to a main control zone activated by the operator.

To the right of this region 100, above the region 80, a zone 102 for displaying the current time is delineated.

The rest of the touchscreen 47, the region 104, which is surrounded by the regions 100, 80 and 49, is intended first and foremost to display information relating to the monitoring of a task monitored by the means 39 when a main control zone associated with this task has been activated by the operator.

Advantageously, when no secondary control zone is associated with a specific task activated by a main control zone, the zone 104 is expanded and furthermore comprises the region 80.

A description is given hereinafter of various examples of operation of the device 9 with the touchscreen 47.

Figure 5:
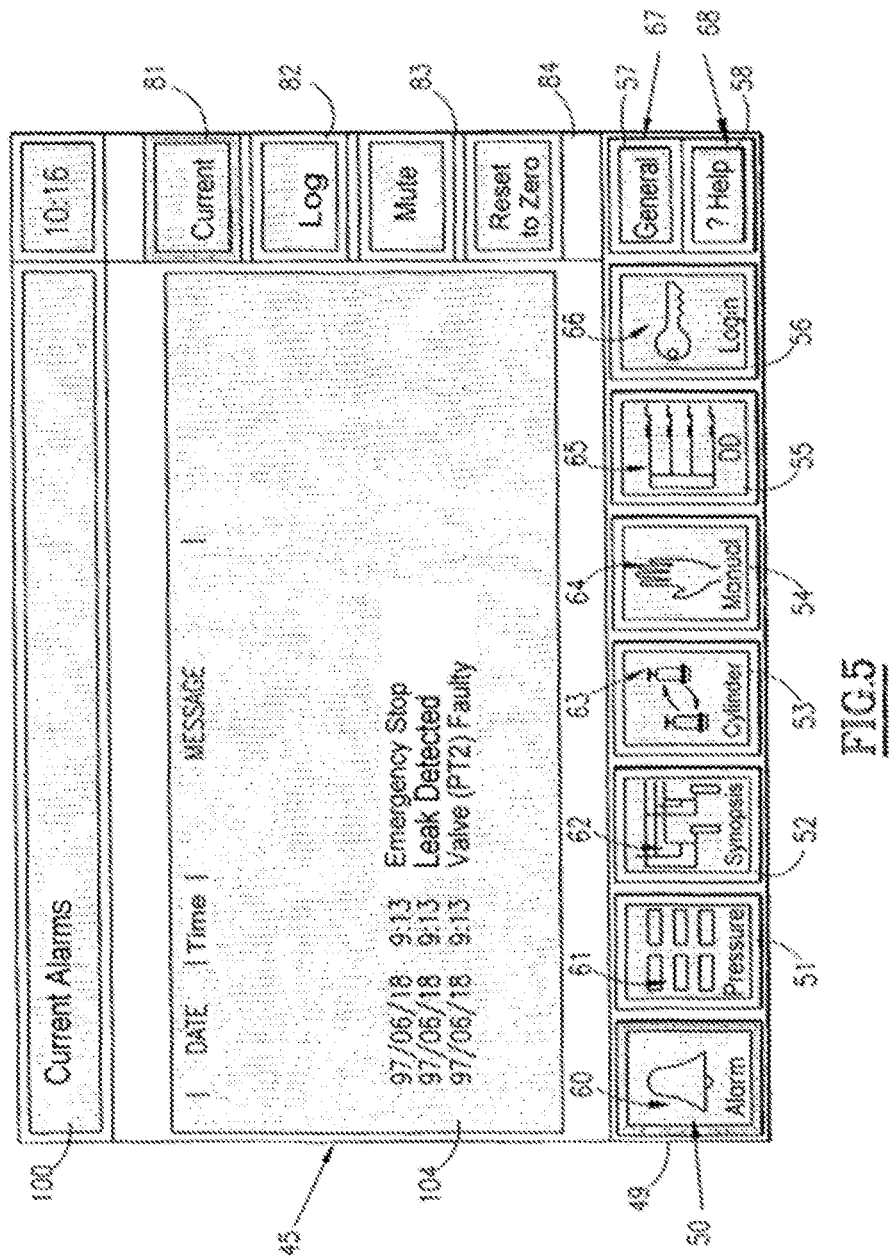
FIG. 5 is a first example of a display on the touchscreen.

For example, in FIG. 4, the graphic 50 shows a bell, below which is written "alarm", and delineates the main control zone 60 relating to an alarm management and display task monitored by the means 39, as was described above. The activation of the zone 60 by an operator brings about the display, in the zone 104 of the touchscreen 47, of the alarms that are raised, as shown in FIG. 5.

Additionally, graphics 81 to 84, delineating secondary control zones 91 to 94 relating to the management and to the display of the alarms, are displayed on the screen. For example, the activation of the secondary zone 92 delineated by the graphic 82 enables a log of alarms to be displayed.

Figure 6:
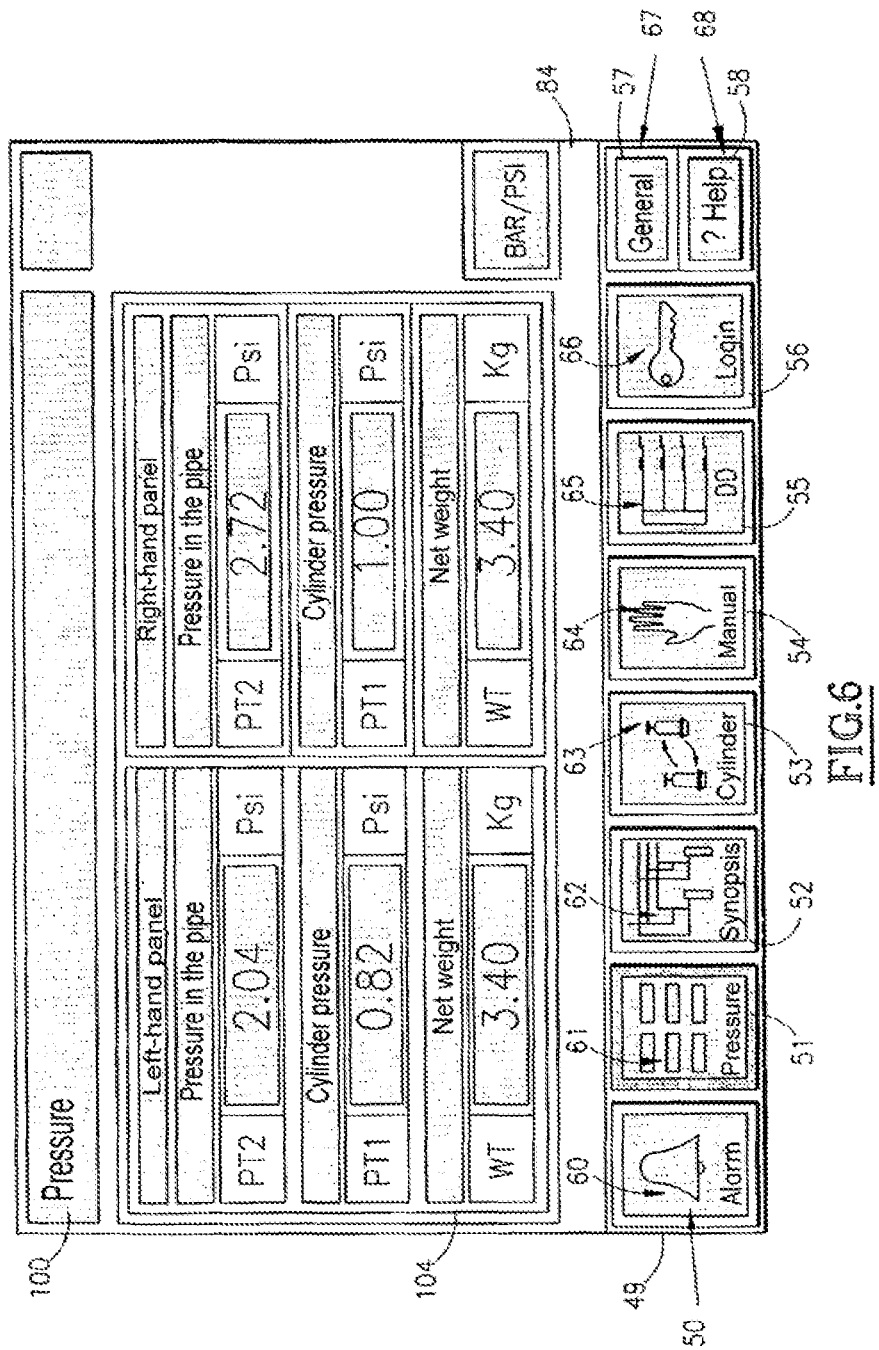
FIG. 6 is a second example of a display on the touchscreen.

The graphic 51 of FIG. 4 shows displays with figures, below which is written "pressure". This graphic 51 delineates the main control zone 61 associated with the activation of a task relating to the capturing of the pressure and weight values that are measured by the sensors 31 and the scales 33, and to the display of these values on the touchscreen 47, as shown in FIG. 6.

Figure 7:
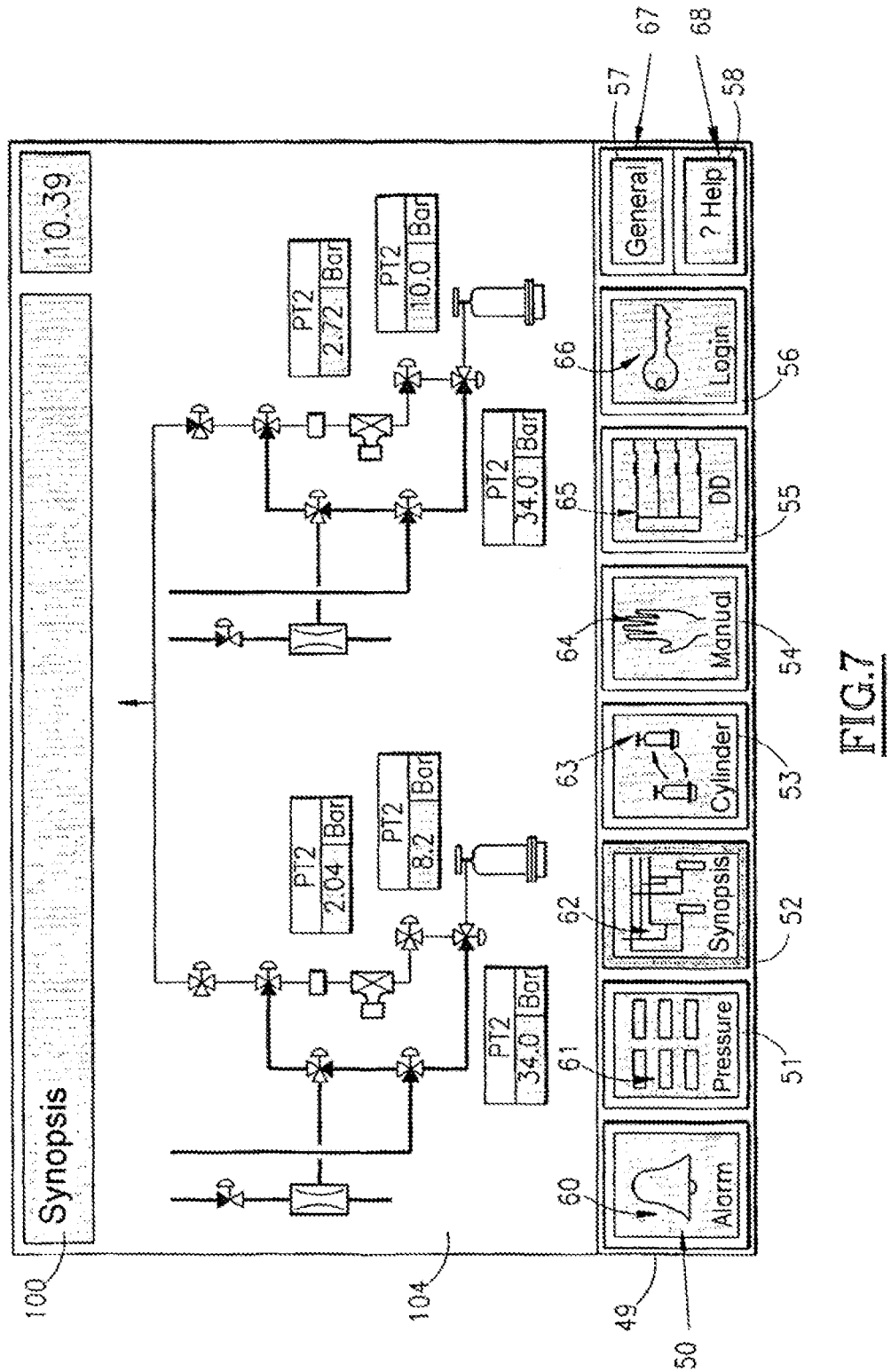
FIG. 7 is a third example of a display on the touchscreen.

The graphic 52 of FIG. 4 shows pipelines and cylinders linked thereto, below which is written "synopsis". This graphic 52 delineates the main control zone 62 associated with the activation of a task relating to the capturing of the measured values measured by the sensors 31 and the scales 33 and to the display, on the touchscreen, of a block diagram of the device, which block diagram is recorded in the storage means 48, jointly with the measured values that are captured, as shown in FIG. 7.

Figure 8:
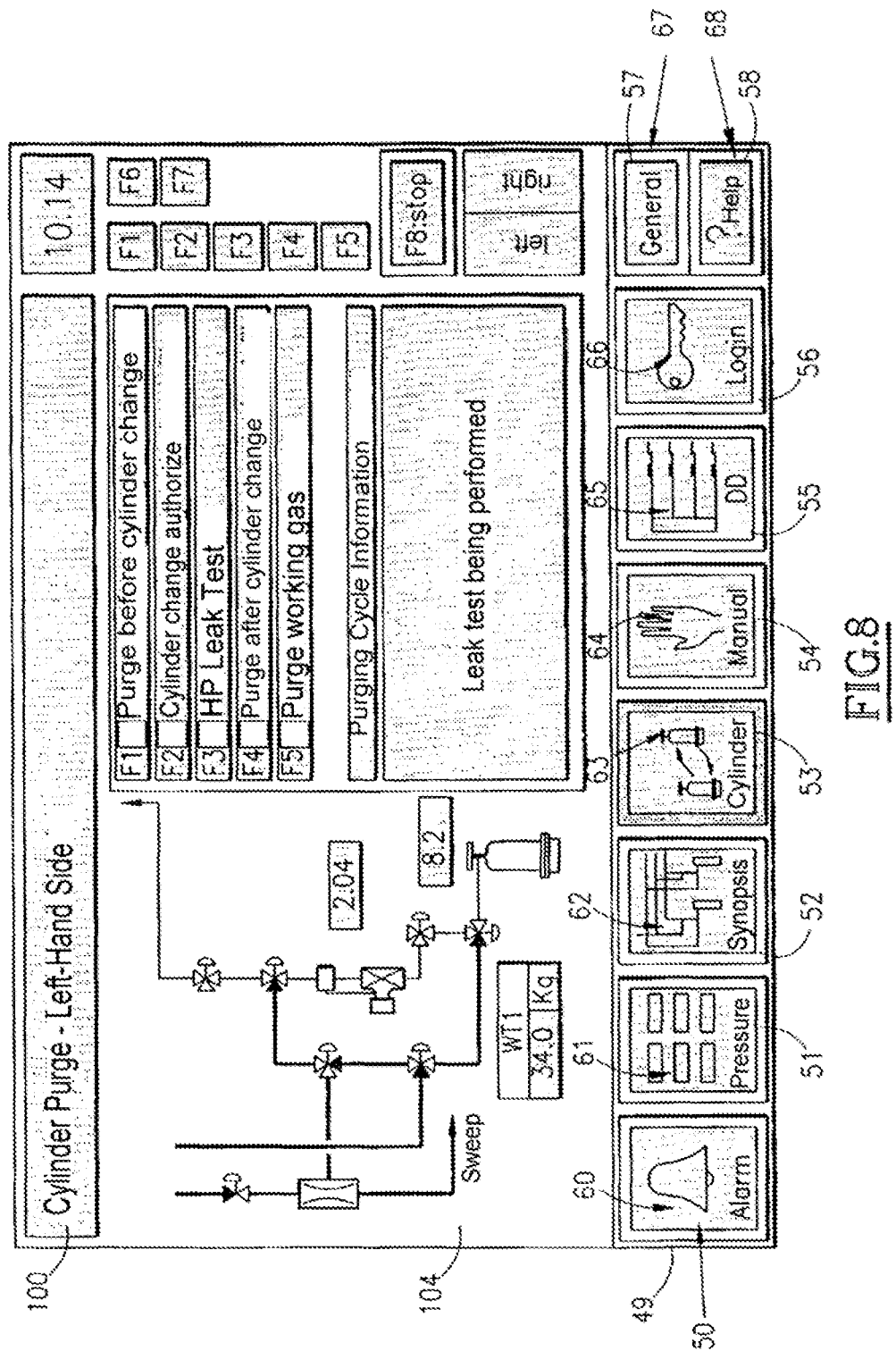
FIG. 8 is a fourth example of a display on the touchscreen.

The graphic 53 of FIG. 4 shows a gas supply facility (a "gas cabinet") with cylinders and arrows signifying a cylinder replacement, below which is written "cylinders". This graphic 53 delineates the main control zone 63 associated with the activation of two tasks. One of these tasks relates to controlling the valves so as to perform purging cycles and leak checks that are necessary before and after each replacement of an empty cylinder with a full cylinder. The other task relates to controlling the valves arranged in the pipelines in order to ensure the switchover of a feed of the distribution device 9 from one of the cylinders 5 or 7 to a feed from the other cylinder 7 or 5. An example of the screens displayed upon activation of the zone 63 is shown in FIG. 8. This shows, on the left-hand side, the block diagram of the part of the facility 1 to which the cylinder change relates, and, on the right-hand side, the various purging and leak checking cycles, which may be activated by the operator for example by way of the secondary control zones that are delineated by squares, in which the codes F1 to F5 are written. A switchover of the feed may be performed by activating the control zones in which the terms "left" and "right" are written.

The graphic 55 of FIG. 4 shows pipelines of a distribution device, below which is written "DD" (for distribution device). This graphic 55 delineates the main control zone 65 associated with the activation of a task relating to the evaluation of the measured values captured by the sensors 31A of the distribution device 9A arranged in series with the device 9 of the facility 1, and to the display, on the touchscreen, of a block diagram of the device 9A, which block diagram is recorded in the storage means 48, jointly with the measured values captured by the sensors 31A.

Through the examples described, it is seen that the use of the touchscreen 47 in the context of devices for distributing a working gas and of facilities for supplying such a gas that are equipped with these devices significantly facilitates the work of the operators responsible for supervising them and enables them to dispense with a long and expensive training program.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A facility for supplying a working gas, equipped with an isolation enclosure (3) and with a door (3') pivotable about a first vertical axis (X) in order to enable said enclosure (3) to be opened and closed, comprising:
  at least one source (5, 7) of a pressurized working gas arranged in the isolation enclosure (3), and a device (9) for distributing a working gas comprising
  a set of pipelines (15, 21, 23) linked to at least one source (5, 7) of a pressurized working gas and to at least one output pipeline (10, 10A) for routing the working gas to a consumer station (10B),
  functional components (25), in particular valves (27, 29, 27A, 29A) arranged in the set of pipelines (15, 21, 23) and used to regulate the flow of the working gas in said pipelines, gas leak detectors (34, 34A), and a monitoring and control unit (35, 35A) comprising a communication link (37) with said functional components (25), a monitoring system (39) configured for and adapted to monitoring tasks relating to said functional components (25), and a user interface (45) configured for and adapted to enable a user to manage the monitoring system (39), wherein the user interface is configured for and adapted to be actuated by an operator of the distribution device (9, 9A), said user interface (45) comprising a touchscreen (47) having main control zones (60, 61, 62, 63, 64, 65, 66, 67, 68) associated with the monitoring of corresponding tasks, characterized in that said touchscreen is attached to a housing (47A) integrated into the door (3'), said housing (47A) being able to and designed to pivot about a second vertical axis (Y).

2. The facility of claim 1, characterized in that the touchscreen (47) has main control zones (60, 61, 62, 63, 64, 65, 66, 67, 68) associated with the monitoring of corresponding tasks, which main control zones (60 to 68) being delineated by graphics (50 to 58) associated with said tasks.

3. The facility of claim 1, characterized in that the touchscreen (47) comprises, for at least one main control zone (60; 61; 62; 63; 64; 65; 66; 67; 68), at least one secondary control zone (91,92,93,94) associated with said at least one main control zone (60; 61; 62; 63; 64; 65; 66; 67; 68) and relating to an instruction for monitoring the task corresponding to said at least one main control zone (60; 61; 62; 63; 64; 65; 66; 67; 68), said at least one secondary control zone (91, 92, 93, 94) being delineated by a graphic (81, 82, 83, 84) associated with said instruction and displayed on said touchscreen (47) only in the event of activation of said corresponding main control zone (60; 61; 62; 63; 64; 65; 66; 67; 68) by an operator.

4. The facility of claim 3, characterized in that the touchscreen (47) comprises a first region (49) reserved exclusively for said main control zones (60 to 68) and a second region (80) separate from said first region (49) and intended for said secondary control zones (91, 92, 93, 94).

5. The facility of claim 4, characterized in that the touchscreen (47) furthermore comprises a third region (100) separate from said first (49) and second (80) regions and reserved for displaying an item of information relating to a main control zone (60; 61; 62; 63; 64; 65; 66; 67; 68) activated by an operator.

6. The facility of claim 3, characterized in that the user interface (45) for managing the monitoring system (39) is additionally configured for and adapted to signal (70), on the touchscreen (47), a control zone (60; 61; 62; 63; 64; 65; 66; 67; 68, 91, 92, 93, 94) activated by an operator.

7. The facility of claim 1, characterized in that a task monitored by the monitoring system (39) relates to the management and display, on the touchscreen (47), of an alarm detected by the functional components (25), and in that one (60) of the main control zones of the touchscreen is a zone for activating a display of the alarm.

8. The facility of claim 1 further comprising measuring sensors (31) for measuring the pressures prevailing in the pipelines (15), characterized in that a task monitored by the monitoring system (39) relates to the evaluation of the measured values captured by said measuring sensors (31) and to a display of said values on the touchscreen (47), and in that one (61) of said main control zones is a zone for activating the display, on the touchscreen, of a measured value.

9. The facility of claim 1 further comprising measuring sensors (31) for measuring the pressures prevailing in the pipelines, characterized in that the user interface (45) comprise a computer memory (48) for storing a block diagram showing the device (9) for distributing the working gas and the valves (27, 29) arranged therein, in that a task monitored by the monitoring system (39) relates to an evaluation of measured values captured by said sensors (31) and to the joint display, on the touchscreen (47), of the block diagram of the distribution device (9), which block diagram is recorded in said computer memory (48), and of said measured values captured by the sensors (31), and in that one (62) of said main control zones is a zone for activating a display, on the touchscreen (47), of the block diagram with the measured values.

10. The facility of claim 1, characterized in that it comprises two sources (5, 7) of working gas, said sources being gas cylinders.

11. The facility of claim 1, characterized in that the user interface (45) for managing the monitoring system (39) is able to and designed to be controlled remotely, by way of a WiFi connection, by a tablet, a smartphone or a portable computer.

12. The facility of claim 1, characterized in that an emergency stop button (B) is attached to said housing (47A), said housing being situated at a height of less than 1.70 m from the ground.

13. The facility of claim 1, characterized in that a size of the touchscreen (47) is less than 12 inches.

* * * * *